United States Patent
Nefcy et al.

(10) Patent No.: US 9,080,542 B2
(45) Date of Patent: Jul. 14, 2015

(54) ENGINE CRANKING TORQUE REFERENCED TO AN ENGINE STOP POSITION

(71) Applicant: FORD GLOBAL TECHNOLOGIES, LLC, Dearborn, MI (US)

(72) Inventors: Bernard D. Nefcy, Novi, MI (US); Marvin P. Kraska, Dearborn, MI (US); Brian T. Soo, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 233 days.

(21) Appl. No.: 13/921,346

(22) Filed: Jun. 19, 2013

(65) Prior Publication Data

US 2014/0373676 A1    Dec. 25, 2014

(51) Int. Cl.
*B60W 10/08* (2006.01)
*F02N 15/02* (2006.01)
*B60W 20/00* (2006.01)
*F02N 11/08* (2006.01)

(52) U.S. Cl.
CPC ............. *F02N 15/022* (2013.01); *B60W 20/00* (2013.01); *F02N 11/08* (2013.01); *F02N 2200/021* (2013.01); *Y10T 74/134* (2015.01)

(58) Field of Classification Search
None
See application file for complete search history.

(56) References Cited

U.S. PATENT DOCUMENTS

| | | | |
|---|---|---|---|
| 6,877,470 B2 | 4/2005 | Mitani et al. | |
| 7,996,145 B2 | 8/2011 | Snyder | |
| 8,192,324 B2 | 6/2012 | Kraska et al. | |
| 2011/0118915 A1 | 5/2011 | Ortmann et al. | |
| 2012/0083385 A1 | 4/2012 | Smith et al. | |
| 2014/0106927 A1* | 4/2014 | Gibson et al. | 477/5 |
| 2014/0352492 A1* | 12/2014 | Nefcy et al. | 74/7 C |

* cited by examiner

*Primary Examiner* — Dirk Wright
(74) *Attorney, Agent, or Firm* — David B. Kelley; MacMillan, Sobanski & Todd, LLC

(57) ABSTRACT

A method for restarting a vehicle engine that is stopped at a known crank angle includes actuating a clutch located in a torque path between a starting motor and the engine with desired pressure related to the known crank angle during the restart, and using the starting motor to drive the engine during the restart.

11 Claims, 6 Drawing Sheets

ENGINE CRANKING TORQUE REFERENCED TO AN ENGINE STOP POSITION

BACKGROUND OF THE INVENTION

1. Field of the Invention

This invention relates generally to a method for starting an engine of a hybrid electric vehicle (HEV) by transmitting torque from a starting motor through a clutch and damper to the engine.

2. Description of the Prior Art

A modular hybrid transmission (MHT) is an arrangement of powertrain components that includes an internal combustion engine, torsion damper, disconnect clutch, electric motor/generator and torque converter arranged in series ahead of an automatic transmission. The electric machine operates as a motor to crank the engine during starting using a high voltage battery as a source of power for the motor.

In an MHT system a key objective is to start the engine consistently and quickly using the least amount of starting motor reserve torque. Using a one-size fits all disconnect clutch pressure profile may produce engine starts with varying accelerations, which presents problems such as fuel/air cranking calibrations, possible no-starts, etc. Increased starting torque requires more reserve starting torque from the starting motor.

Varying the operative pressure profile of the disconnect clutch based on speed is likely difficult to control due its reliance on information that becomes available too late for ideal application to the engine stating procedure. Furthermore, a vehicle system controller (VSC) controls electric machine torque and possibly speed. A disconnect clutch pressure controller adjusts clutch actuation pressure based on engine speed or acceleration, thereby producing the potential for engine speed control difficulty. A VSC receives input from the vehicle operator, coordinates the engine and electric machine, and may disconnect the clutch and transmission.

SUMMARY OF THE INVENTION

A method for restarting a vehicle engine that is stopped at a known crank angle includes actuating a clutch located in a torque path between a starting motor and the engine with desired pressure related to the known crank angle during the restart, and using the starting motor to drive the engine during the restart.

The method uses different open loop pressure profiles for the disconnect clutch pressure control based on the position of the engine when it stops.

The disconnect clutch pressure profile established how much electric machine torque will be directed to cranking the engine. If the disconnect clutch pressure profile changes based on the stopping position of the engine, a reduction of torque required to crank the engine may be realized or anticipated.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
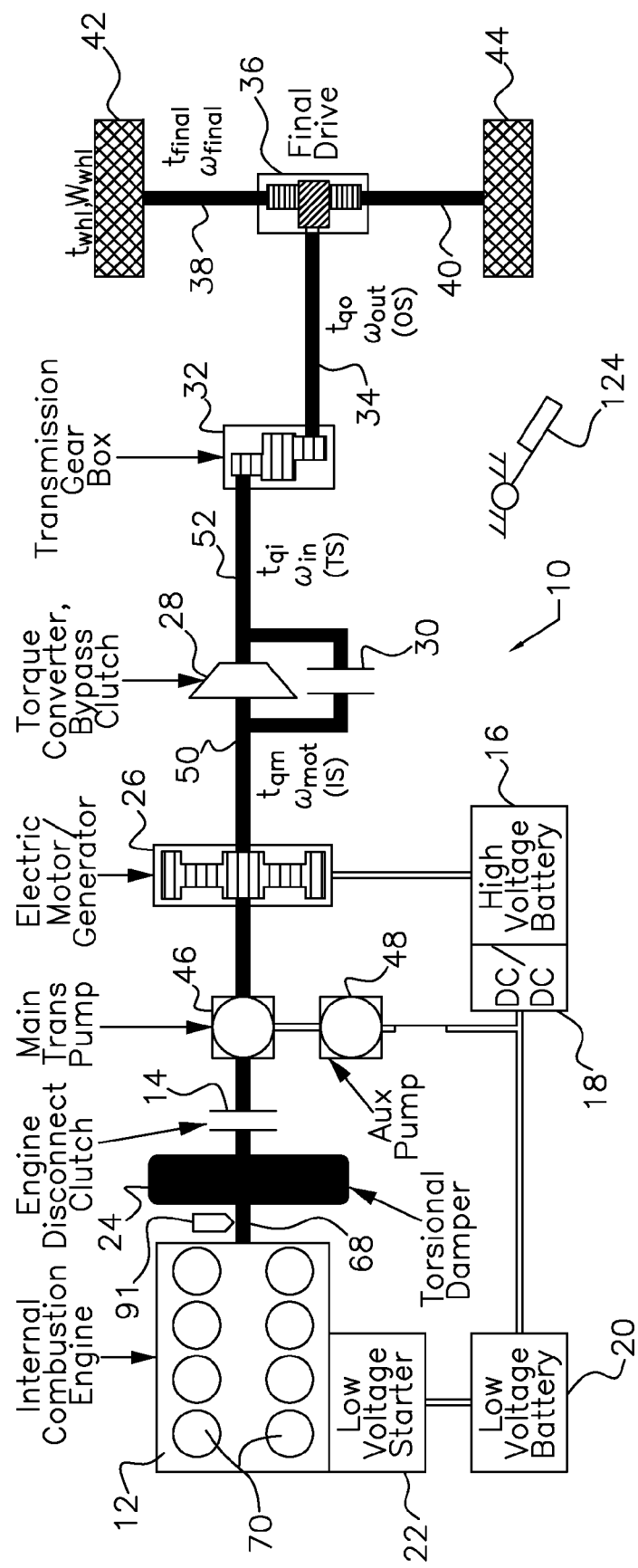
FIG. 1 is a schematic diagram showing an arrangement of components related to the powertrain for a HEV.

FIG. 1 illustrates an MHT configuration of powertrain 10 components that includes an internal combustion engine 12, an engine disconnect clutch 14, a high voltage battery 16, a high voltage to low voltage DC/DC converter 18, low voltage battery 20, low voltage starter 22, torsion damper 24, electric machine 26, torque converter 28, torque converter bypass clutch 30, transmission gear box 32, driveshaft 34, final drive gearing 36, halfshafts 38, 40, and driven wheels 42, 44.

The torsion damper 24 comprises a coiled spring or a mechanism that includes multiple coiled springs, wherein torsion applied to the damper causes displacement of the spring mechanism. Torsional energy is dissipated by the damper 24 due to frictional contact between the moving springs and the walls of a damper casing containing the springs.

A main transmission pump 46, driven by the engine 12, supplies pressurized hydraulic fluid to the hydraulic system of the transmission 32 and the torque converter 28. An auxiliary oil pump, driven by an electric motor (not shown), supplies pressurized hydraulic fluid to the hydraulic system of the transmission 32 and the torque converter 28 when the engine is off.

The internal combustion engine (ICE) 12 is connected to the electric machine 26 and transmission 32 through the disconnect clutch 14, which can engage and disengage the engine from the powertrain to satisfy operational requirements of the hybrid vehicle in different modes.

The high voltage electric machine 26 is secured to the impeller shaft 50 of the torque converter 28. The electric machine 26 is powered by the high voltage battery 16.

The HEV powertrain 10 could share the same transmission hardware with conventional vehicles but different control algorithm, e.g. a regular step ratio transmission could be used in the powertrain to drive the vehicle.

The torque converter 28 used in this configuration is preferably identical to the torque converter used in conventional automatic transmissions. When bypass clutch 30 is open, differential speed between the transmission input shaft 52 and the impeller shaft 50 is possible. When the bypass clutch 30 is closed the torque converter impeller and turbine are mechanically connected, in which case the speed of the electric machine 26 and transmission input 52 are substantially identical.

Alternatively, other types of automatic transmissions can be used in the powertrain 10, e.g. a continuously variable transmission (CVT) having a drive belt engaged with a two pulleys, or an automatic manual transmission, or other HEV technologies. The overall hybrid operation is similar but details of the mechanism disconnecting the motor from the transmission are different.

The torsion damper 24 is a mechanical component having the primary function of modulating or eliminating high frequency torsional vibration from the powertrain 10. The engine 12 is cranked to start by the high voltage motor 26.

Engine cranking torque required to pull up an engine varies significantly base on the position of engine at crank. Less torque is required to start an engine when an engine piston 70 is advancing close to top dead center in its cylinder than when the cylinder is farther from, but approaching top dead center.

The torque required to overcome the first and second compression strokes of an engine, when engine speed is low and compression energy is lost, i.e., does not drive the engine crankshaft during the expansion stroke, will change based on the crank angle at which the engine is stopped. The crank angle varies between 0 degrees and 720 degrees for a four stroke engine.

Figure 2:
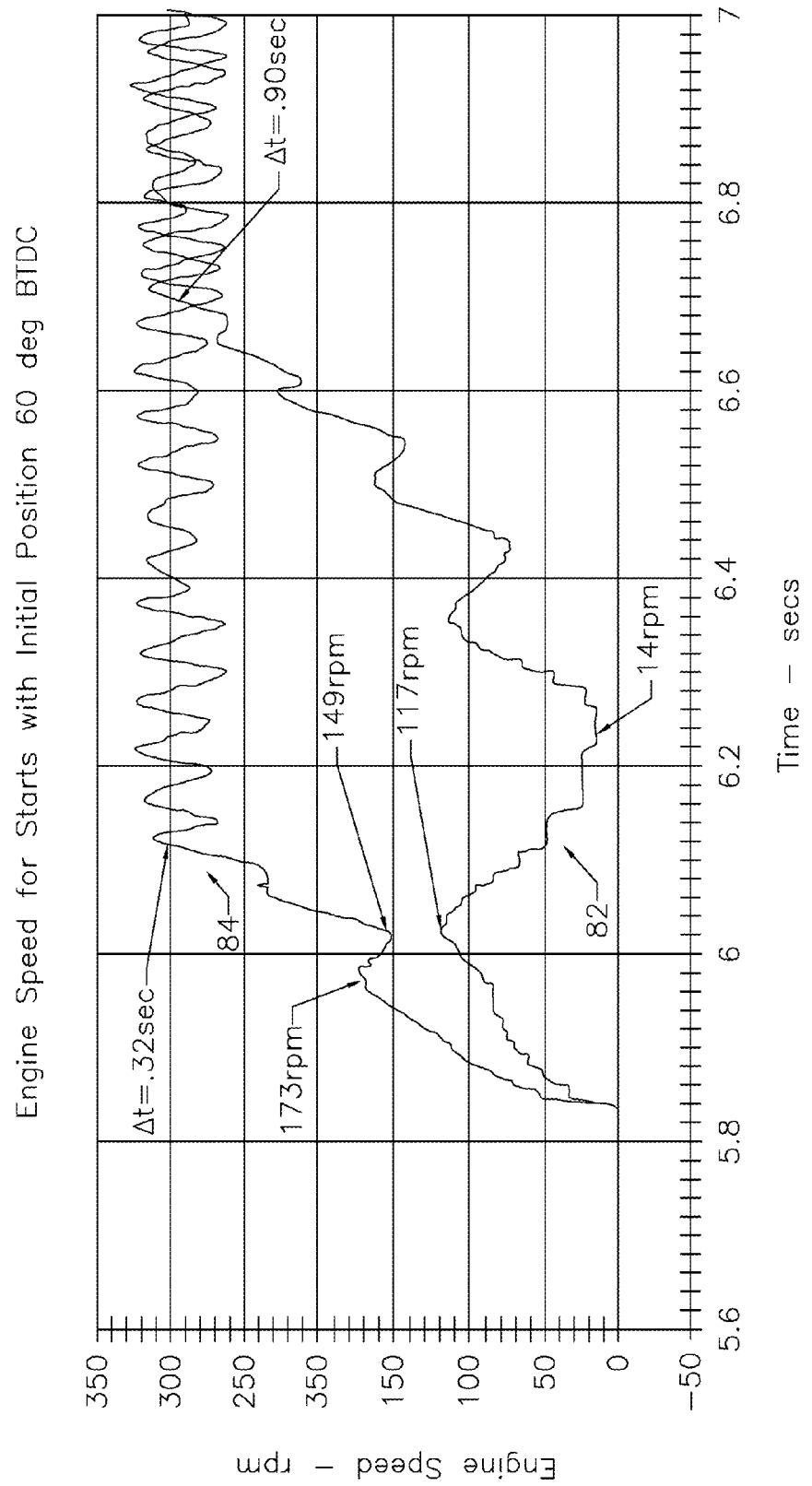
FIG. 2 is graph showing the relation between engine speed and time while starting an engine that had been stopped at 60 degrees with starting torque low and high.

FIG. 2 shows that for an engine stopped at 60 degrees BTDC, the first few compression strokes of a starting engine waste energy and provide no compression help on the expansion stroke. When starting torque is low 82, the period length for engine speed to reach 300 rpm is longer than when starting torque is higher 84.

Figure 3:
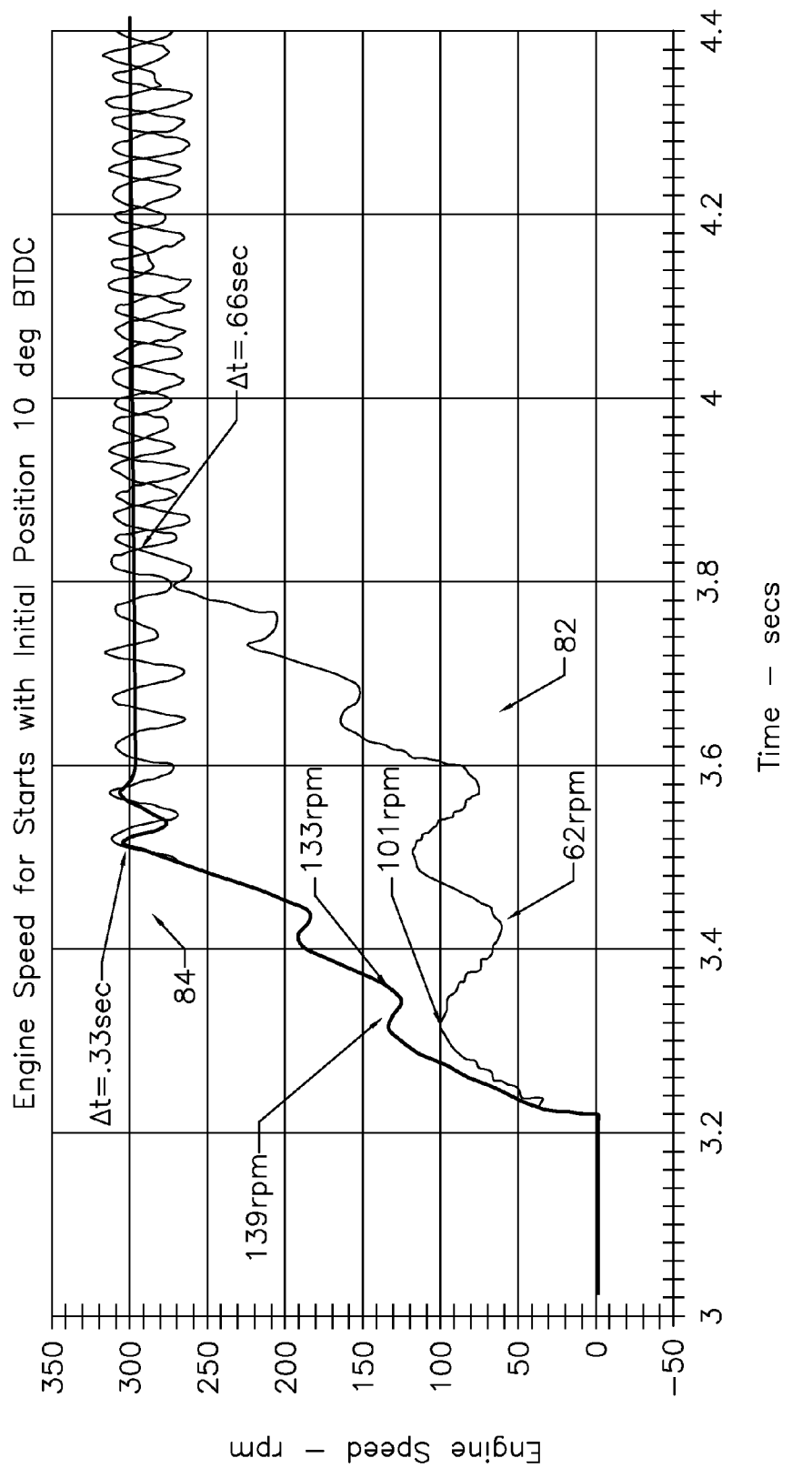
FIG. 3 is graph showing the relation between engine speed and time while starting an engine that had been stopped at 10 degrees with starting torque low and high.

FIG. 3 shows that for an engine stopped at 10 degrees BTDC, after the second compression stroke energy from the compressed air-fuel mixture on the expansion stroke increases reducing the period length required for engine speed to reach 300 rpm.

Figure 4:
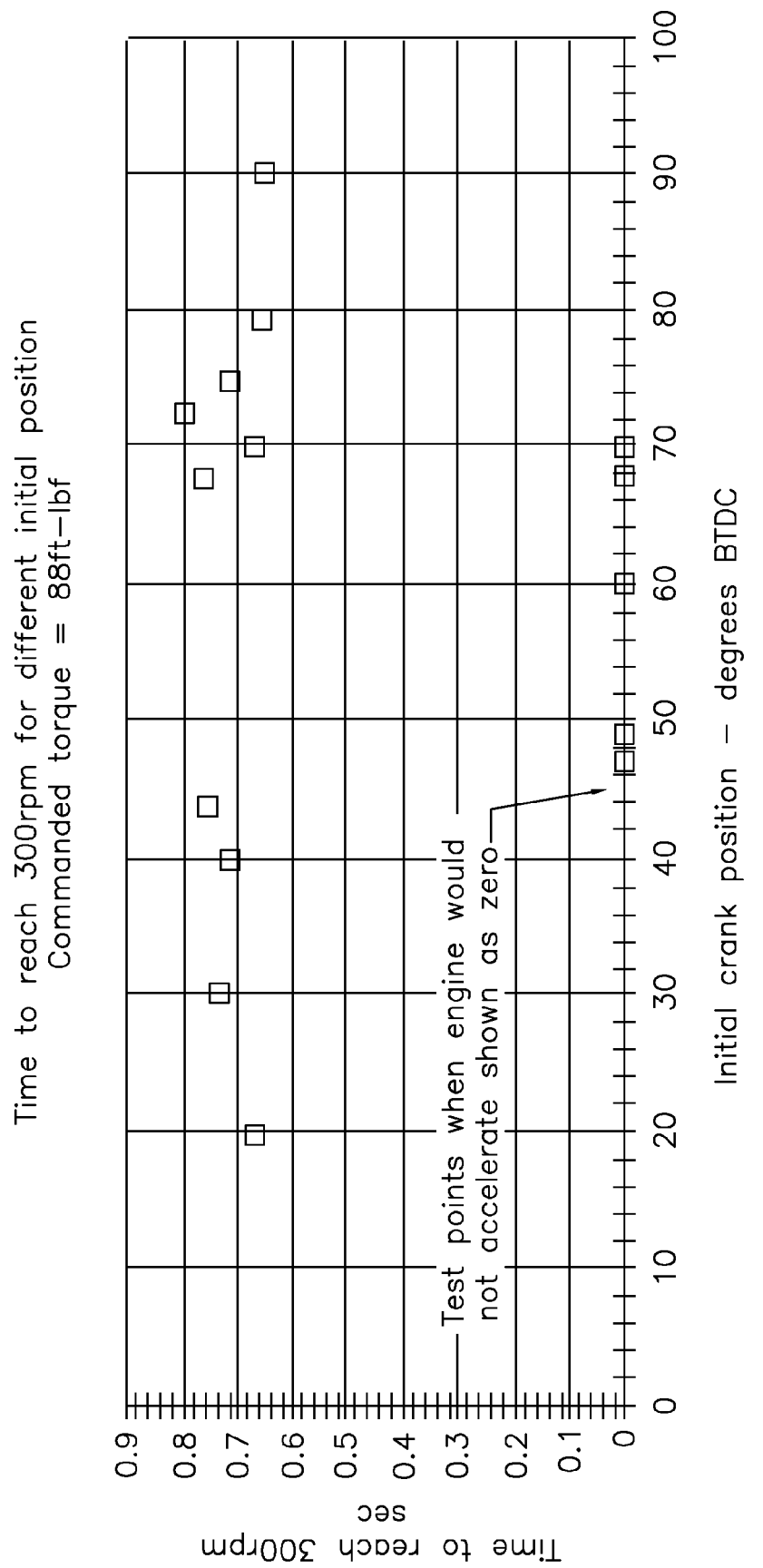
FIG. 4 is graph showing the relation between initial crank position and time for the engine to reach 300 rpm.

FIG. 4 shows that over a range of engine crank positions when a relatively low magnitude of cranking torque is applied, the engine may not accelerate.

Figure 5:
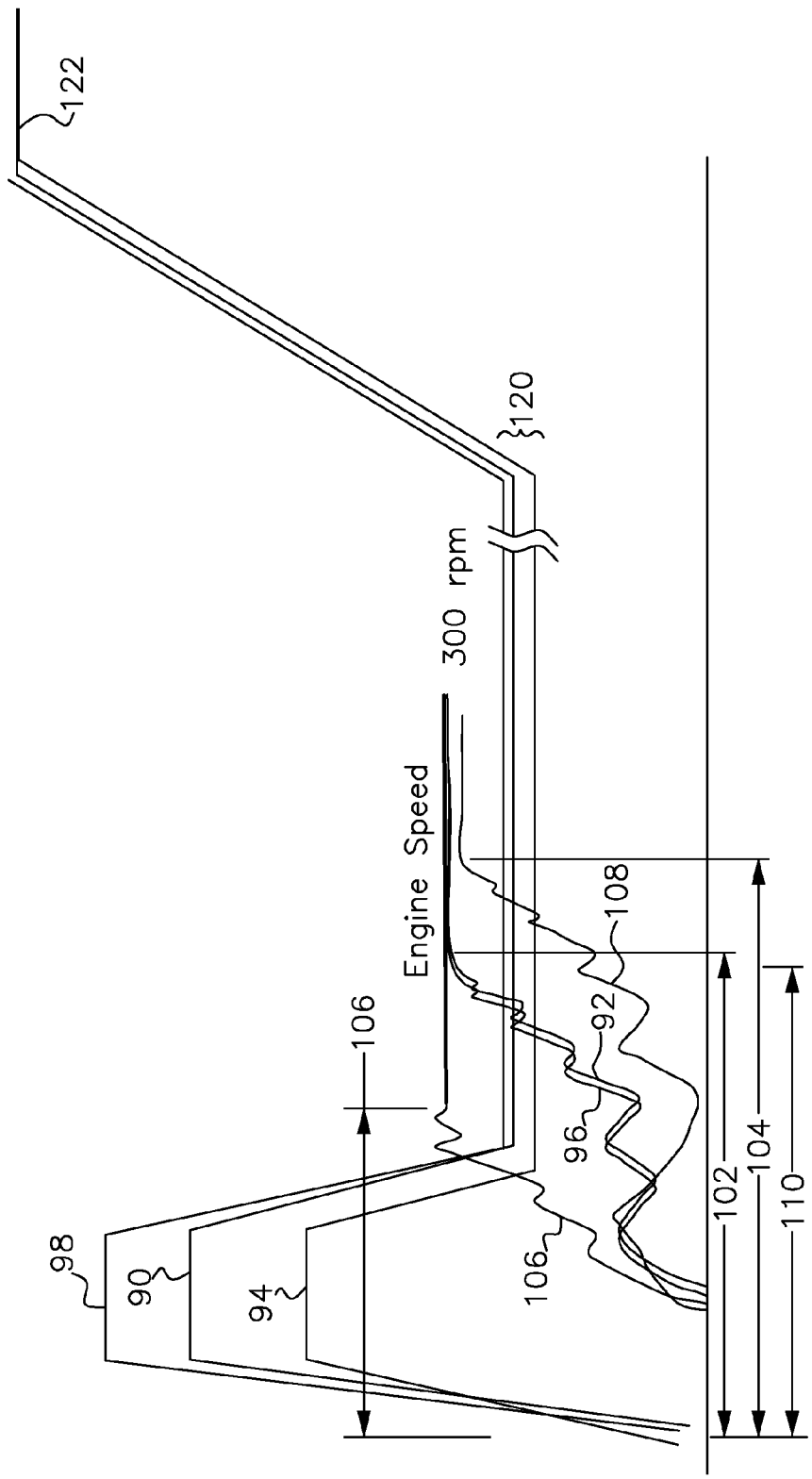
FIG. 5 shows various disconnect clutch pressure profiles and the corresponding engine speed variation during an engine restart.

FIG. 5 shows a pressure profile 90 for disconnect clutch 14 when the engine 12 is stopped at 60 degrees BTDC, as determined from an electronic signal representing an engine crank angle produced by sensor 91. When hydraulic pressure of 56.5 psi is supplied to clutch 14, the torque transmitting capacity of the clutch is 73 lb-ft. Curve 92 shows the corresponding increase of engine speed during a period 102 required for engine speed to reach 300 rpm using clutch pressure profile 90.

Similarly, FIG. 5 shows a pressure profile 94 for disconnect clutch 14 when the engine 12 is stopped at 10 degrees BTDC. When hydraulic pressure of 52.5 psi is supplied to clutch 14, the torque transmitting capacity of the clutch is 65 lb-ft. Curve 96 shows the corresponding increase of engine speed during the period 102 required for engine speed to reach 300 rpm using clutch pressure profile 94.

The clutch pressure profile 98 for disconnect clutch 14 when the engine 12 is stopped at 60 degrees BTDC with hydraulic pressure of 62.5 psi supplied to clutch 14, produces 85 lb-ft of clutch torque transmitting capacity. Curve 104 shows that the engine speed corresponding to clutch pressure profile 98 increases rapidly to 300 rpm.

The engine start produced by pressure profile 98 is premature, i.e., occurs over a period 106 that is too short for the operating conditions or vehicle operator's expectations, and wastes energy, which is supplied by starting motor 26.

Curve 108 shows that an alternate engine start that is produced by pressure profile 98 is delayed, i.e., requires a period 110 that is too long for the engine speed to reach 300 rpm, particularly so when the engine start is initiated by the vehicle operator's depressing the accelerator pedal. Preferably the period 102 for engine speed to reach 300 rpm has a consistent length.

Each of the disconnect clutch pressure profiles 90, 94, 98 determines how much electric machine torque will be directed to cranking the engine 12. If the disconnect clutch pressure profile changes based on the stopping position of the engine, a reduction of torque required to crank the engine may be realized or anticipated.

Figure 6:
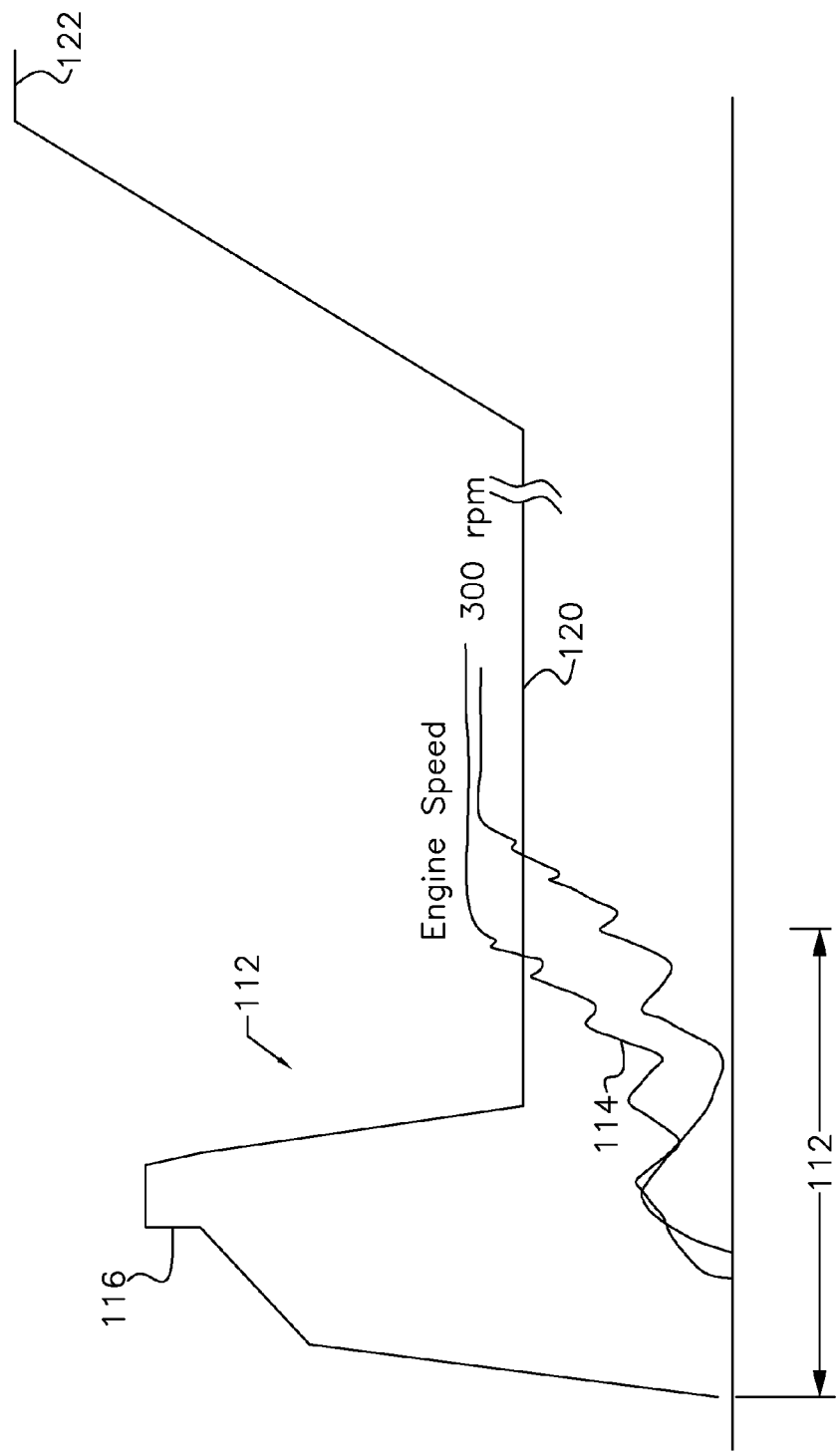
FIG. 6 shows a variation of one of the pressure profiles of FIG. 5 and the corresponding engine speed variation during an engine restart.

FIG. 6 shows a variation 112 of the disconnect clutch pressure profile 90 of FIG. 5 and the corresponding engine speed variation 114 during an engine restart. The desired pressure profile 11, applicable when the engine 12 is stopped at 60 degrees BTDC, provides a stepwise increase in clutch pressure when needed at 114 instead of the linear increase of pressure profile 90 whose peak magnitude supplied to clutch 14 is of 56.5 psi. Curve 114 shows the corresponding increase of engine speed during a period 112 required for engine speed to reach 300 rpm.

The open loop pressure profiles for disconnect clutch pressure control are selected and applied to crank and start engine 12 with reference to the angular position of the engine, i.e., the crank angle of the stopped engine, and the basis for a command to restart the engine.

For example, if the vehicle is operating in electric mode with the engine stopped, and the state of charge of battery 16 is low, the powertrain controller will issue a command to restart the engine using the electric machine 26. An engine restart under such condition is preferably smooth, of high quality and occurs over a consistent length 102. The engine restart occurs at relatively low cranking torque with the desired disconnect clutch pressure profile being 90 or 94, depending on the crank angle position of engine 12 while stopped.

But if the vehicle operator initiates an engine restart, such as by depressing the accelerator pedal 124, the engine restart occurs over a relatively short period 106 at relatively high cranking torque. Under such operating conditions the engine restart may be less smooth and of shorter duration and the desired disconnect clutch pressure profile is 98 depending on the crank angle position of engine 12 while stopped.

In order to facilitate sustained engine combustion following engine cranking, the magnitude of pressure applied to clutch 14 decreases. After combustion becomes sustained in engine 12, the magnitude of pressure applied to clutch 14 increases to a magnitude that is able to transmit engine torque through the electric machine 26, torque converter 28, transmission gearing 32 and final drive 36 to the driven wheels 42, 44.

In accordance with the provisions of the patent statutes, the preferred embodiment has been described. However, it should be noted that the alternate embodiments can be practiced otherwise than as specifically illustrated and described.

The invention claimed is:

1. A method for restarting a vehicle engine that is stopped at a known crank angle, comprising:
    (a) actuating a clutch located in a torque path between a starting motor and the engine with desired pressure related to the known crank angle during the restart;
    (b) using the starting motor to drive the engine during the restart.

2. The method of claim 1, wherein the desired pressure changes a capacity of the clutch to transmit torque from the starting motor to the engine during the restart.

3. The method of claim 1, further comprising decreasing pressure applied to the clutch during a first period of the restart.

4. The method of claim 3, further comprising increasing pressure applied to the clutch during a second period following the first period.

5. The method of claim 1, wherein step (a) wherein the desired pressure for actuating the clutch during the restart is applied in response to a command to restart the engine.

6. The method of claim 5, wherein step (a) wherein a magnitude of the desired pressure for actuating the clutch during the restart depends on one of depressing an accelerator pedal and need to increase a state of charge of an electric storage battery.

7. A method for restarting a vehicle engine that is stopped at a known crank angle, comprising:
   (a) locating a clutch in a torque path between a starting motor and the engine;
   (b) actuating the clutch with a desired pressure related to the known crank angle in response to a command to restart the engine;
   (c) using the starting motor to drive the engine during the restart.

8. The method of claim 7, wherein the desired pressure changes a capacity of the clutch to transmit torque from the starting motor to the engine during the restart.

9. The method of claim 7, further comprising decreasing the desired pressure applied to the clutch during a first period of the restart.

10. The method of claim 9, further comprising increasing the desired pressure applied to the clutch during a second period following the first period.

11. The method of claim 7, wherein step (b) wherein the desired pressure for actuating the clutch during the restart depends on one of depressing an accelerator pedal and need to increase a state of charge of an electric storage battery.

\* \* \* \* \*